United States Patent [19]
Grant

[11] Patent Number: 5,325,008
[45] Date of Patent: Jun. 28, 1994

[54] CONSTRAINED RIPPLE SPRING ASSEMBLY WITH DEBONDABLE ADHESIVE AND METHODS OF INSTALLATION

[75] Inventor: James J. Grant, Niskayuna, N.Y.

[73] Assignee: General Electric Company, Schenectady, N.Y.

[21] Appl. No.: 987,801

[22] Filed: Dec. 9, 1992

[51] Int. Cl.$^5$ ............................................... H02K 3/48
[52] U.S. Cl. ........................................ 310/214; 29/446
[58] Field of Search ............... 310/214, 215, 217, 194, 310/65, 213; 29/596, 598, 446, 447

[56] References Cited

U.S. PATENT DOCUMENTS

| | | | |
|---|---|---|---|
| 3,909,931 | 10/1975 | Lambrecht | 29/596 |
| 4,015,156 | 3/1977 | Johrde | 310/214 |
| 4,369,389 | 1/1983 | Lambrecht | 310/214 |
| 4,853,565 | 8/1989 | Elton et al. | 310/214 |
| 5,053,663 | 10/1991 | Böer et al. | 310/214 |
| 5,099,159 | 3/1992 | Liptak et al. | 310/45 |

FOREIGN PATENT DOCUMENTS 964175  7/1964  United Kingdom .

*Primary Examiner*—Steven L. Stephan
*Assistant Examiner*—E. Io
*Attorney, Agent, or Firm*—Nixon & Vanderhye

[57] ABSTRACT

A constrained ripple spring assembly 26 is disposed in the radial slots 12 of a dynamoelectric machine and radially between the windings 14 and the wedges 20 maintaining the windings in the slots. The ripple springs 28 are adhesively secured to flat surfaces, for example, the underside of the wedges or one or two filler strips 30, 32, such that the spring assemblies are substantially flat upon insertion. At a predetermined elevated temperature, the adhesive bond is broken, enabling the spring to expand into a natural corrugated shape to apply a radial loading against the wedges and winding.

13 Claims, 3 Drawing Sheets

CONSTRAINED RIPPLE SPRING ASSEMBLY WITH DEBONDABLE ADHESIVE AND METHODS OF INSTALLATION

TECHNICAL FIELD

The present invention relates to a constrained ripple spring assembly for use in dynamoelectric machine rotor and stator slot support systems and methods of installing the ripple spring assembly and wedges in the slots.

BACKGROUND

In generators for power generating equipment, one or more windings are typically provided in a plurality of generally radially and axially extending, circumferentially spaced, slots. The windings are maintained within these slots by sets of wedges located partially in complementary surfaces adjacent the openings of the slots. The slots are disposed in the rotor and stator of the dynamoelectric machine. In the following description, the invention is described with respect to stator bars in stator slots, although it will be appreciated that the invention has like applicability to windings in the rotor slots.

Radial space in the stator slots is taken up by filler strips held in the slots between the wedges and the stator windings. As the generator ages, the materials will typically creep and shrink, tending to open up spaces between the stator bars, filler strips and wedges. In early machines of this type, flat filler strips were employed. However, in a short period of time, for example, within one or two years, the parts would become loose and it was necessary to remove the wedges, apply additional filler strips and re-wedge the machine. That process was oftentimes repeated.

Radial ripple springs have been previously used in order to progressively take up the clearance in the slots caused by creepage and shrinkage of the materials whereby a tight stator bar, filler strip and wedge arrangement may be maintained in the slot. When first installed, the radial ripple springs are compressed to about 80% of their full compression. As the various parts of the winding shrink, creep and settle, the springs expand and maintain radially opposed forces on the winding and wedges, respectively. Thus, radial ripple springs serve to provide follow-up forces where clearances would otherwise grow as the generator ages.

Because the current assembly procedures require the ripple springs to be compressed during the wedging process, the procedures are tedious and laborious. For example, it is first determined how much space there is between the wedges and stator bar. This is accomplished by disposing filler strips in the space. Once that dimension is determined, the filler strips are removed so that the ripple springs can be inserted in their stead. To insert the ripple springs into the machine, the springs are typically located between a pair of flat fillers. With these composite fillers and ripple springs disposed in the stator slots, the wedges are driven longitudinally along the slots, compressing the ripple springs. Currently, about 80% of the compressive force of the springs can be compressed by this wedging process, although the radial inward force on the stator wedges during installation makes it difficult to drive or displace the wedges longitudinally along the slot. Consequently, the more compression the spring is initially subjected to, the more difficult it is to drive the wedges. Further, efforts to drive the wedges to compress the springs to more than 80% of their full compression has resulted in radial forces so high that the material of the wedges will start to de-laminate. Thus, there is a practical limit to the degree of compression to which the ripple springs may be subjected during installation. Further, there is no readily suitable method for checking the spring compression when the assembly is complete.

DISCLOSURE OF THE INVENTION

According to the present invention, there is provided a constrained ripple spring which, in its compressed substantially flattened condition, is adhesively bonded to a rigid filler strip or strips or to the flat underside of the wedge. The adhesive bonding of the constrained ripple spring to the filler strip or wedge maintains the ripple spring compressed and is stable in normal environments at ambient temperature. At a predetermined elevated temperature, the adhesive releases the constrained ripple spring for expansion. The now unconstrained ripple spring tightens the arrangement of the windings, filler strips and wedges in the slots.

In forming the constrained ripple springs for use with filler strips, large sheets of ripple springs and fillers are provided. Adhesive is disposed between those sheets and the sheets are pressed together with the rippled spring sheet being compressed against and adhered to the filler sheet. After the adhesive is cured, the sheets are cut into discrete filler strips to fit within the stator slot.

In one application of the present invention for installing ripple springs in new generators, the constrained ripple springs and filler strips are cut into the appropriately sized strips of ripple spring assemblies, as noted above. The strips and springs are then inserted into the slots and wedged. The entire generator, as conventional, is then placed in an oven and baked. The temperatures at which the generator is typically baked and the baking time for the generator, for example, baking at 105° C. for 12 hours, affords sufficient time and temperature for the adhesive to release or debond from the filler strip(s) or wedge which, in turn, releases the springs to expand and hold the parts tightly in the slots. Most adhesives have a time/temperature relationship and, for this particular application, the 105° C. and 12 hours typical of an initial bake cycle for new generators are sufficient for the adhesive to lose its adhesive or bonding characteristics. The ripple spring is thereby released from its constraint and expands to tighten the slot.

For other applications, for example, in-service applications where the generator cannot be baked, an adhesive is employed which will have a release temperature above ambient temperature corresponding substantially to the normal operating temperatures of the generator. For example, the release temperature may be about 60° C.

It will be appreciated also that the selected adhesive, once released, will not rebond when the temperature is reduced to ambient or below the bonding release temperature. Additionally, the adhesive must not contaminate the windings or the generator's cooling gas, which is normally comprised of hydrogen or air. A currently available adhesive having these characteristics is Eastman 910, manufactured by Eastman Kodak, Rochester, N.Y.

In a preferred embodiment according to the present invention, apparatus is provided for maintaining a stator bar in the slot of a dynamoelectric machine radially outwardly of at least one wedge disposed in the slot adjacent a radial innermost portion of the slot and radially inwardly of the one stator bar, comprising means for forming an elongated flat surface and an elongated leaf spring extending in a longitudinal direction and corrugated in a transverse direction such that the corrugations are longitudinally spaced from one another, the spring being compressed in a direction generally normal to the longitudinal and transverse directions into a constrained spring-loaded configuration. An adhesive is provided for bonding the spring and the flat surface to one another at ambient temperature, with the spring in the constrained spring-loaded configuration enabling the spring for placement in the slot radially outwardly of the one wedge, the adhesive being responsive to a predetermined elevated temperature to release the adhesive bond between the spring and flat surface such that the spring is movable toward a non-compressed state for applying a radially outwardly directed spring force to the stator bar.

In a further preferred embodiment according to the present invention, there is provided a dynamoelectric machine having a plurality of radially and longitudinally extending slots circumferentially spaced from one another about an axis with each slot opening in a radial direction along a longitudinal extent thereof, windings in the slots, wedges disposed in the slots adjacent said slot openings and spring assemblies in the slots between the wedges and the windings for providing radially directed forces on the windings. Each spring assembly includes an elongated filler strip and an elongated leaf spring extending in an axial direction, the leaf spring including a plurality of wave portions longitudinally spaced from one another and compressed from a relaxed state in a generally radial direction into a constrained, substantially flat, spring-loaded state, the spring assembly further including an adhesive bonding the spring and the filler strip to one another at ambient temperature with the spring in the constrained, substantially flat, spring-loaded state, the adhesive being responsive to a predetermined elevated temperature in the slots to release the adhesive bonds between the springs and the filler strips such that the springs load the wedges and the windings in the slots.

In a further preferred embodiment according to the present invention, there is provided a method for radially loading windings in the slots of a dynamoelectric machine wherein the slots are closed adjacent open ends thereof by wedges in the slots, comprising the steps of adhesively securing an elongated ripple spring and a filler strip to one another, with the spring in a compressed state, locating the ripple spring and filler strip, with the spring in the compressed state, in the slot between the wedge and the winding and elevating the temperature in the slot to a predetermined temperature such that the adhesive bond between the spring and the filler strip is broken whereby the spring expands to load the winding in the slot.

In a further preferred embodiment according to the present invention, there is provided a method of radially loading windings in slots forming a part of a dynamoelectric machine wherein the slots are closed adjacent open ends thereof by wedges in the slots, comprising the steps of providing a spring assembly including an elongated ripple spring and an elongated filler strip, securing the spring and the filler strip one to the other by means forming solely part of the spring assembly such that the spring lies in a compressed state in the spring assembly, locating the ripple spring assembly with the spring in the compressed state in the slot between the wedge and the winding and releasing the securing means, enabling the spring to expand in the slot to apply a radial force to the windings in the slot.

Accordingly, it is a primary object of the present invention to provide a novel and improved constrained ripple spring assembly and methods of installing a ripple spring into the slots of a generator in a manner which facilitates the wedging of the slots and maintains the windings tight within the slots over the age of the machine.

BEST MODE FOR CARRYING OUT THE INVENTION

Reference will now be made in detail to a present preferred embodiment of the present invention, an example of which is illustrated in the accompanying drawings. As indicated previously, the present invention has application to both the stator and rotor of a dynamoelectric machine. Although the following is written specifically to refer to the stator, it will be understood that the invention has equal applicability to the rotors of a dynamoelectric machine.

Figure 1:
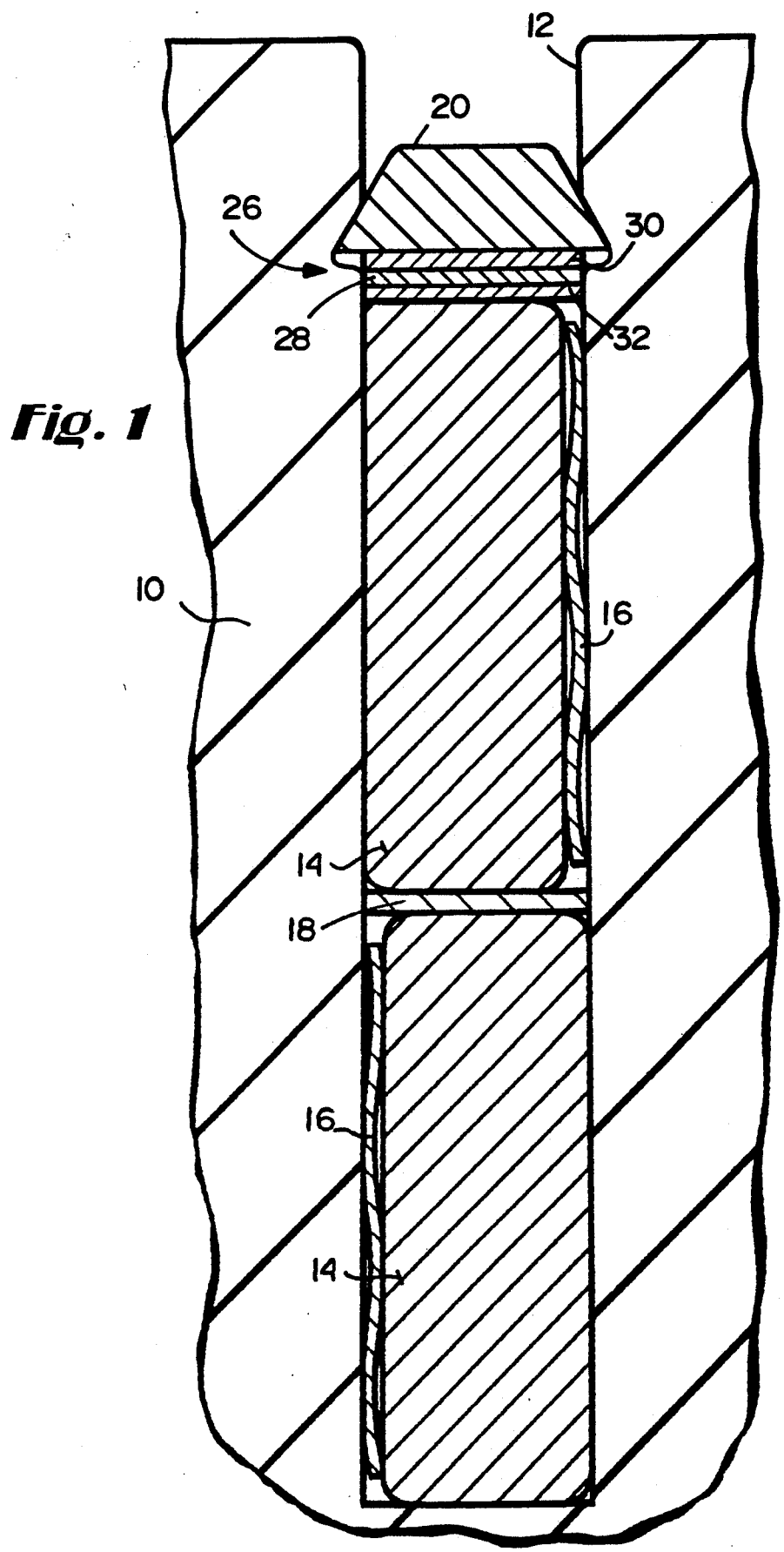
FIG. 1 is a fragmentary cross-sectional view of a slot in a stator of a dynamoelectric machine housing the windings, wedges and a constrained ripple spring assembly according to the present invention, the ripple spring assembly being illustrated in its constrained state prior to debonding.

Referring now to the drawings, particularly to FIG. 1, there is illustrated a stator body 10 of a dynamoelectric machine having a plurality of radially extending slots 12 for housing windings or stator bars 14. As will be appreciated, the body 10 is rotatable about an axis and the slots 12, as well as the stator bars 14, extend longitudinally parallel to that axis and in a generally radially inward direction. In the illustrated form, side ripple springs 16 maintain the bars firmly against the opposite sides of the slot 12. Radial space in the slots 12 is taken up by radial fillers 18. As in the conventional cooled stator slot configuration, wedges 20 extend longitudinally along the innermost portions of the slots with their lateral edges residing in shaped grooves 24 formed in the slots.

Figure 4:
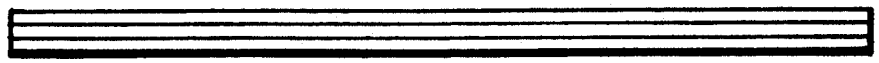
FIG. 4 is a further embodiment of a constrained ripple spring assembly hereof wherein the ripple spring is disposed in a compressed or contracted state between a pair of filler strips.

In a preferred embodiment and in accordance with the present invention, there is provided between wedges 20 and the innermost stator winding 14 a constrained ripple spring assembly, generally designated 26, and comprised of a ripple spring 28 bonded between a pair of filler strips 30 and 32. The spring 28 is illustrated in a constrained or compressed state prior to debonding from the filler strips, as will become clear from the ensuing description. The spring assembly, and particularly the ripple spring 28, when debonded from filler strips 30 and 32, in the preferred form hereof, expands to load both the wedge and the stator windings in opposite radial directions, hence taking up any clearances which may develop in the slot as a result of creep and shrinkage. The wedge is formed conventionally of epoxy glass or cotton phenolic. The filler strips are preferably formed of an epoxy glass laminate. The constrained ripple spring 28 is formed of a fiberglass resin composition, e.g., a polyamide glass laminate. The constrained ripple spring assembly prior to insertion into the stator slot is illustrated in FIG. 4 with the spring 28, in a flattened compressed configuration, disposed between and adhesively bonded to the two filler strips 30 and 32.

As will be appreciated from the foregoing description, ripple spring 28 is initially compressed to a substantially flat configuration and, in that flat configuration, bonded, preferably by an adhesive, to a flat surface, preferably between a pair of elongated flat filler strips 30 and 32. Consequently, the ripple spring 28 lies in a compressed biased state, constrained by the adhesive and the filler strips. When the adhesive is heated to a predetermined temperature, the bond between the ripple spring and the flat surfaces of the filler strips is broken and the spring tends to expand toward its natural unstressed state. For example, in FIG. 5, the adhesive has lost its adhesive characteristics and the spring assemblage of FIG. 1 is illustrated in a condition where the spring assembly is exerting a load on the wedges and stator windings, i.e., after the adhesive bond has been broken. It will be appreciated from a review of FIG. 5 that the ripple spring 28, once debonded, comprises an elongated leaf spring which is corrugated in its natural state, with the corrugations extending transversely to the longitudinal direction of the spring and, in this orientation, generally tangentially to the axis of rotation of the rotor body. Thus, the corrugations or wave portions are spaced one from the other in the longitudinal direction.

Figure 2:
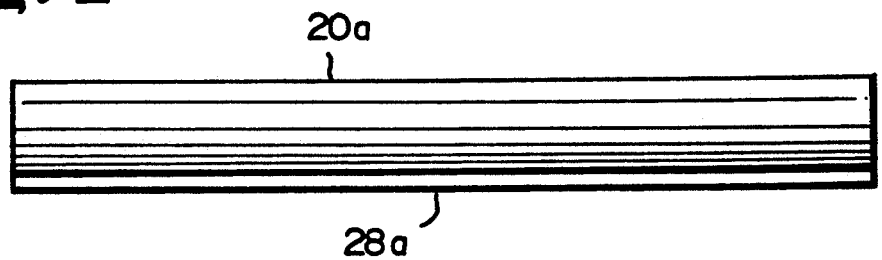
FIG. 2 is a side elevational view with portions broken out of a constrained ripple spring adhesively bonded to the underside of a plurality of wedges.

In another form of the present invention, for example, as illustrated in FIG. 2, the ripple spring 28a is adhesively bonded to the underside of the wedge 20a. Thus, with one or more or no filler strips between the spring and the stator windings, upon debonding of the adhesive between the ripple spring 28a and the flat underside of wedge 20a, the spring expands toward its normal corrugated configuration, loading the wedge and winding.

Figure 3:
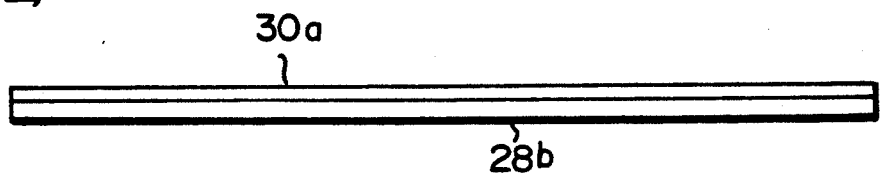
FIG. 3 is a side elevational view illustrating a a ripple spring assembly comprised of a ripple spring constrained in a substantially flat configuration by an adhesive bond to a flat filler strip.

In FIG. 3, the spring assembly comprises a ripple spring 28b and a single filler strip 30b, with adhesive bonding the ripple spring 28b in a flat compressed configuration to the filler strip 30b. In order to ensure that the spring assembly prior to debonding lies in a flat configuration, the filler strip should be approximately five times stiffer than the ripple spring.

Figure 5:
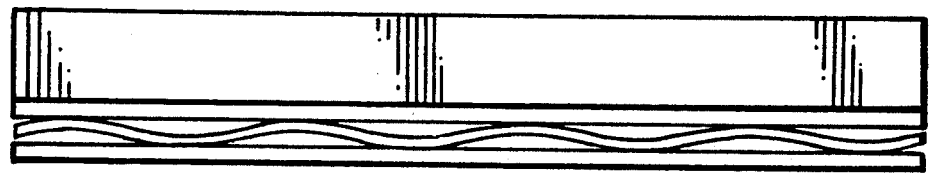
FIG. 5 is a side elevational view of a wedge with the spring assembly of FIG. 4 in an operative condition after the adhesive bond has been broken, the stator slot in which the wedge and ripple spring assembly are disposed not being illustrated in this view.
Figure 6:
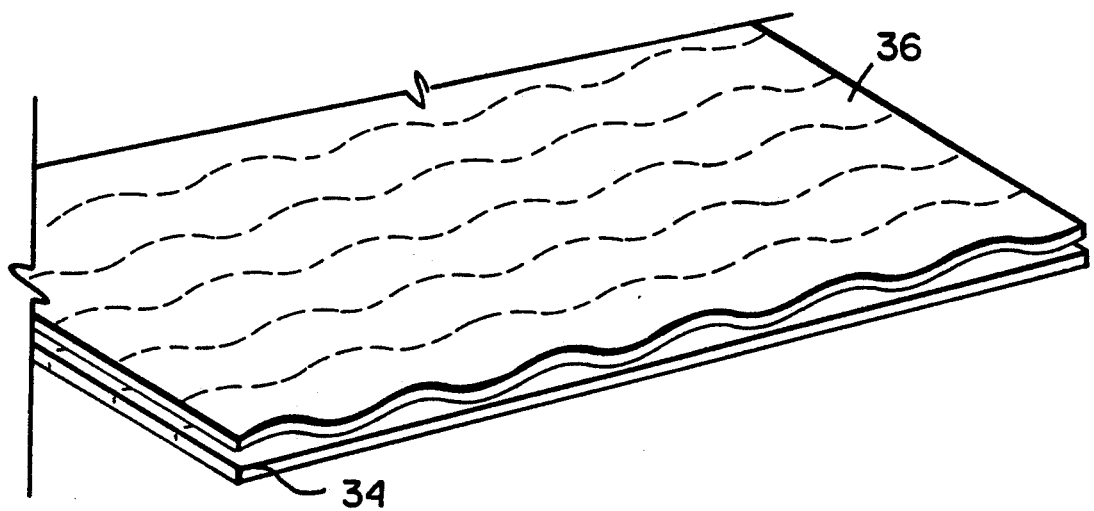
FIG. 6 is a fragmentary perspective view of a spring sheet bonded to a filler strip sheet and from which sheets a constrained spring assembly according to the present invention is formed.

In FIG. 6, there is illustrated a filler sheet 34 and a sheet 36 from which the respective fillers and ripple springs may be formed. Particularly, the sheets are bonded to one another with spring sheet 36 lying essentially in a flat configuration against the flat filler sheet 34, with the adhesive maintaining the sheet 36 in a compressed state. Once the adhesive is cured, the assemblage can be cut into elongated strips forming the spring assembly. It will be appreciated that the spring assembly of FIG. 5 is similarly formed with a second filler sheet overlying the ripple spring sheet 36.

The adhesive is selected such that the ripple spring and the flat surface, i.e., the underside of the wedge or one or more filler strips, are adhesively bonded one to the other under ambient temperature conditions, with the ripple spring constrained or compressed. At an elevated temperature, for example, 60° C. and over a predetermined period of time, the adhesive bond is broken, permitting the ripple spring to expand toward its natural corrugated state and, hence, loading the wedge and windings. Adhesive materials have various time/temperature relations. It has been found, in accordance with the present invention, that an adhesive having a debonding characteristic at about 60° C., and a release time of approximately one month is satisfactory. An adhesive of this type would be eminently satisfactory for field use rather than for the manufacture of new dynamoelectric machines. Other adhesives may be used having a debonding temperature of between 100°-105° C., which temperature would cause the adhesive to debond within the conventional 12-hour bake cycle to which conventional dynamoelectric machines, upon their initial manufacture, are subjected prior to use. An adhesive useful for purposes of the present invention is identified under the trade name of Eastman 910, manufactured by the Eastman Kodak Company, Rochester, N.Y. A further characteristic of these adhesives is that the adhesive will not cause a rebonding of the ripple spring to the flat surface, i.e., the underside of the wedge or the filler strip or strips, when temperature conditions are lowered below normal operating conditions, e.g., ambient, after debonding.

In using the constrained ripple spring assembly of the present invention, and with respect to the preferred embodiment hereof illustrated in FIGS. 1 and 5, the constrained ripple spring assembly is inserted into the slots along the inner edges of the windings. The wedges are then sequentially inserted into their grooves in overlying relation to the spring assemblies. In contrast to prior spring assemblies and wedge assembly methods, the wedges are relatively easily inserted in a longitudinal direction because the ripple springs lie in a substantially flat state and are not further compressed by insertion of the wedges. If the constrained ripple spring assemblies hereof are located in a new dynamoelectric machine, and that machine is placed in an oven for baking, the adhesive will debond at the oven temperature of approximately 100°-105° C. during the baking period of about 12 hours. The springs thus will release and expand, taking up any clearances within the slots. For field installations, where rewedging is required, and baking of the generator cannot be accomplished, the adhesive employed for the replacement ripple spring assemblies may have a lower release temperature, for example, at about 60° C. Consequently, at ambient, the adhesive will maintain the ripple springs in a compressed condition. When the generator is operated and normal operating temperatures of approximately 60° C. are obtained, the adhesive will release over time, enabling the ripple springs to load the wedges and windings.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. Apparatus for maintaining a stator bar in a radial slot of a dynamoelectric machine radially of at least one wedge disposed in the slot, comprising:
   a member for forming an elongated flat surface;
   an elongated leaf spring extending in a longitudinal direction and corrugated in a transverse direction such that the corrugations are longitudinally spaced from one another, said spring being compressed in a direction generally normal to said longitudinal and transverse directions into a constrained spring-loaded substantially flattened configuration; and
   an adhesive bonding said spring and said flat surface to one another at ambient temperature maintaining said spring in said constrained, substantially flattened, spring-loaded configuration and enabling the spring for placement in the slot adjacent the one wedge, said adhesive being responsive to a predetermined elevated temperature to release the adhesive bond between the spring and flat surface such that said spring is movable toward a non-compressed state for applying a radially directed spring force to the stator bar.

2. Apparatus according to claim 1 wherein said member comprises a flat filler strip.

3. Apparatus according to claim 1 wherein said member comprises a surface of said wedge.

4. Apparatus according to claim 1 wherein said predetermined elevated temperature is about 60° C. or above.

5. Apparatus according to claim 1 wherein said member comprises a first elongated flat filler strip extending along one side of said spring, a second elongated flat filler strip extending along the opposite side of said spring, an adhesive bonding said spring and said second filler strip to one another at ambient temperature with said spring in said constrained spring-loaded configuration, the latter adhesive being responsive to a predetermined elevated temperature to release the adhesive bond between the spring and said second filler strip such that said spring is movable toward its non-compressed state.

6. In a dynamoelectric machine having a plurality of radially and longitudinally extending slots circumferentially spaced from one another about an axis with each slot opening in a radial direction along a longitudinal extent thereof, windings in said slots and wedges disposed in the slots adjacent said slot openings, spring assemblies in said slots between said wedges and said windings for providing radially directed forces on said windings, each said spring assembly including an elongated filler strip and an elongated leaf spring extending in an axial direction, said leaf spring including a plurality of wave portions longitudinally spaced from one another and compressed from a relaxed state in a generally radial direction into a constrained substantially flat, spring-loaded state, said spring assembly further including an adhesive bonding said spring and said filler strip to one another at ambient temperature with said spring in said constrained, substantially flat, spring-loaded state, said adhesive being responsive to a predetermined elevated temperature in said slots to release the adhesive bonds between said springs and said filler strips such that said springs load said wedges and said windings in said slots.

7. In a dynamoelectric machine according to claim 6 wherein each said spring is comprised of fiberglass impregnated with a resin.

8. In a dynamoelectric machine according to claim 6 wherein each spring assembly includes a second elongated filler strip lying along a side of said spring opposite to the side along which the first-mentioned filler strip is adhesively bonded, said adhesive bonding said second filler strip and said spring to one another at ambient temperature, with said spring in said constrained spring-loaded state, said adhesive being responsive to said predetermined elevated temperature in said slots to release the adhesive bonds between said springs and said second filler strips such that said springs load said wedges and said windings in said slots.

9. In a dynamoelectric machine according to claim 6 wherein said slots are disposed in a stator body and open radially inwardly.

10. A method for radially loading windings in the slots of a dynamoelectric machine wherein the slots are closed adjacent open ends thereof by wedges in said slots, comprising the steps of:
    adhesively securing an elongated ripple spring and a filler strip to one another, with the spring in a compressed state;
    locating said ripple spring and said filler strip, with said spring in said compressed state, in said slot between said wedge and said winding; and
    elevating the temperature in said slot to a predetermined temperature such that the adhesive bond between the spring and the filler strip is broken whereby said spring expands to load the winding in the slot.

11. A method according to claim 10 including adhesively securing said ripple spring and a second filler strip to one another, said spring lying in said compressed state and between said filler strips, said adhesive releasing the bond between said spring and said second filler strip in response to elevating the temperature in said slot to said predetermined temperature such that the adhesive bond between the spring and the second filler strip is broken.

12. A method of radially loading windings in slots forming a part of a dynamoelectric machine wherein the slots are closed adjacent open ends thereof by wedges in said slots, comprising the steps of:
    providing a spring assembly including an elongated ripple spring and an elongated filler strip;
    securing said spring and said filler strip one to the other by means forming solely part of said spring assembly such that said spring lies in a compressed state in said spring assembly;
    locating said ripple spring assembly with said spring in said compressed state in said slot between said wedge and said winding; and
    releasing said securing means, enabling said spring to expand in said slot to apply a radial force to the windings in the slot.

13. A method according to claim 12 including providing a spring assembly with a second elongated filler strip, said filler strips lying on opposite sides of said elongated ripple spring, securing said second filler strip and said spring one to the other by means forming solely part of said spring assembly such that said spring lies in a compressed state between said filler strips in said spring assembly, and releasing said securing means securing said second filler strip and said compressed spring to one another enabling said spring to expand in said slot to apply a radial force to the windings in the slot.

* * * * *